Sept. 15, 1931.  J. S. MAXWELL  1,822,976
AIRFOIL
Filed July 23, 1929   2 Sheets-Sheet 1
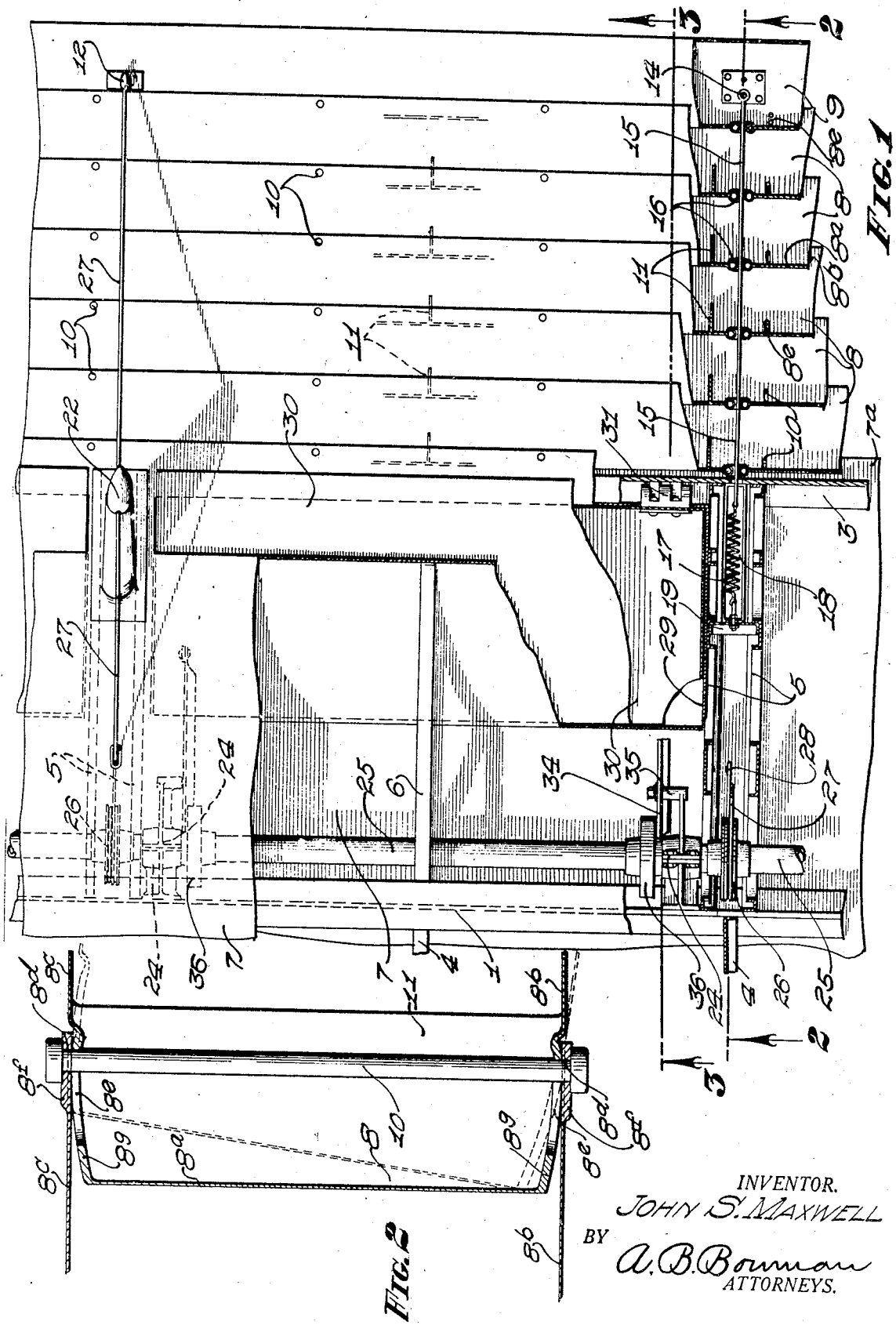
INVENTOR.
JOHN S. MAXWELL
BY
A. B. Bowman
ATTORNEYS.

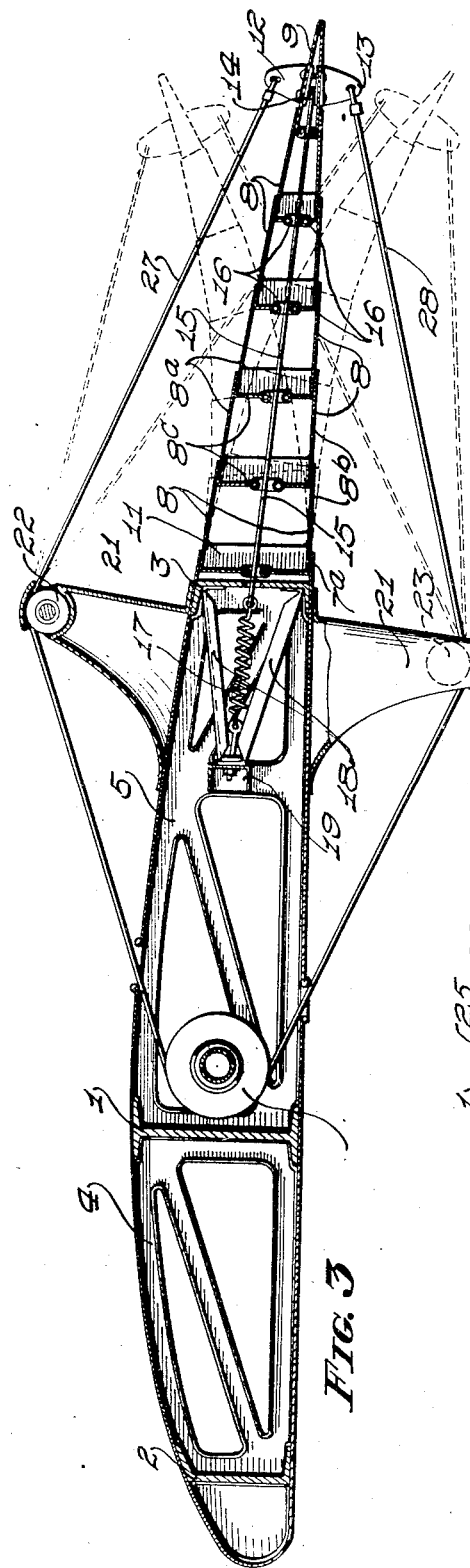
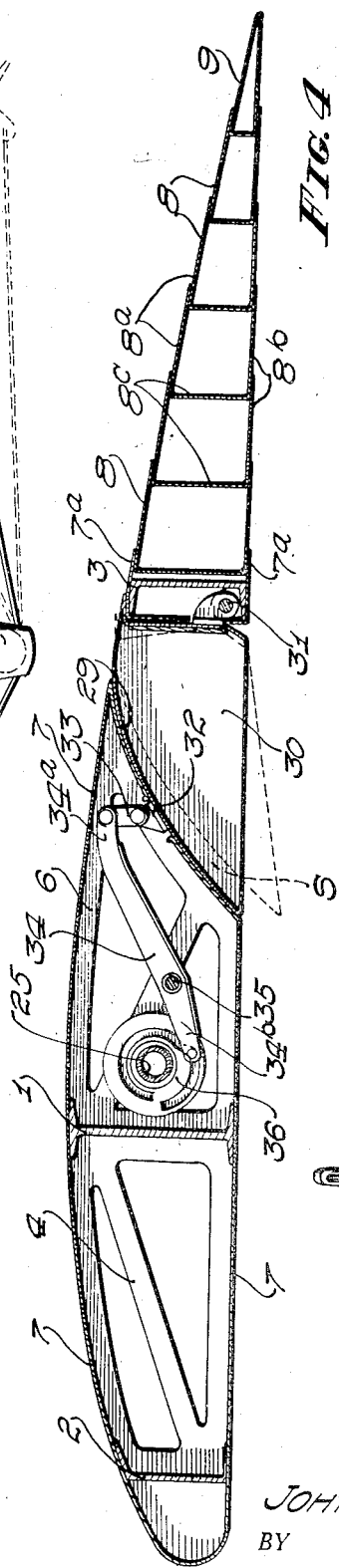
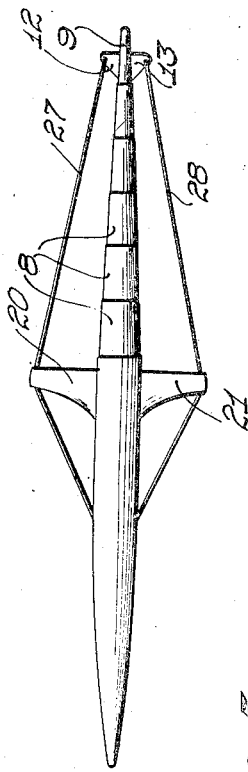
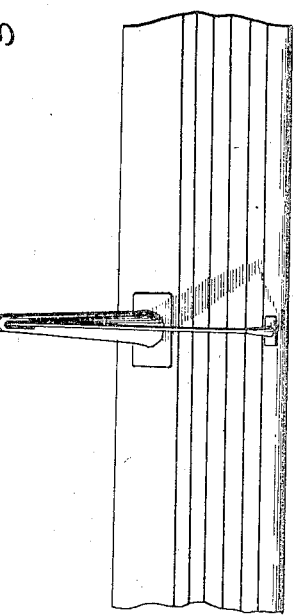

Patented Sept. 15, 1931

1,822,976

UNITED STATES PATENT OFFICE

JOHN S. MAXWELL, OF SAN DIEGO, CALIFORNIA

AIRFOIL

Application filed July 23, 1929. Serial No. 380,420.

My invention relates to airfoils, and the objects of my invention are: first, to provide an airfoil which may be used as a sustaining means, such as a wing, or may be used as a control means, such as an aileron, fin, rudder, or the like; second, to provide an airfoil having a variable controllable camber, thereby enabling the lifting force of the airfoil to be varied at will; third, to provide a sustaining airfoil which enables an airplane so equipped to have a low landing and takeoff speed without materially reducing its high speed; fourth, to provide an airfoil in which the variable portions thereof approximate a curved streamline surface in any of the various positions so as to reduce eddies or whirls and the inefficiency resulting therefrom to a minimum; fifth, to provide an airfoil which when used as a control means has a minimum drag in all positions; sixth, to provide an airfoil which increases the maneuverability of an airplane; seventh, to provide an airfoil in which when in the position for maximum lift air is introduced along its upper or higher cambered surface so as to reduce the likelihood of the slip stream breaking away from the wing; eighth, to provide a variable airfoil which may be used on any type of aircraft; ninth, to provide a variable airfoil which need not weigh much more than the conventional non-variable airfoil; tenth, to provide a variable airfoil in which the air stream therefrom flows smoothly for all the positions thereof, thereby reducing interference with other airfoils which may be rearward in the slip stream of forward airfoils; eleventh, to provide a variable airfoil which when the airplane is in normal flight has approximately the same characteristics as a non-variable airfoil, and, twelfth, to provide on a whole a novelly constructed variable airfoil which is simple of construction proportional to its functions, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a fragmentary plan view of an airfoil embodying my invention, with parts and portions broken away and in section to facilitate the illustration; Fig. 2 is an enlarged view of the joint connecting adjacent wing section members; Fig. 3 is a transverse sectional view of my airfoil used as a wing or sustaining means, taken through 3—3 of Fig. 1; Fig. 4 is another transverse sectional view thereof through 4—4 of Fig. 1; Fig. 5 is a fragmentary rear elevational view thereof, and Fig. 6 is a side elevational view of my airfoil used as a control means.

Similar characters of reference refer to similar parts and portions throughout the several views of the drawings.

Spar members 1, 2 and 3, ribs 4, 5 and 6, wing covering 7, wing section members 8, trailing edge member 9, pin members 10, webs 11, anchors 12 and 13, rivets 14, tension cables 15, guides 16, springs 17, spring supports 18, brace members 19, horns 20 and 21, pulleys 22 and 23, bearings 24, control operating shaft 25, cable drums 26, cables 27 and 28, wing openings 29, gate members 30, hinges 31, brackets 32, link members 33, levers 34, lever supports 35, and cams 36, constitute the principal parts and portions of my airfoil.

When my airfoil is designed to function as a sustaining means, a main spar 1 is provided which is positioned approximately one-third the wing cord from the leading edge. A second spar 2 is provided adjacent to the leading edge, and a third spar 3 about a third of the wing cord from the trailing edge. The positions of these spar members vary considerably depending upon the design of the wing.

The spar members 1 and 2 are spaced apart from each other by rib members 4. The spar members 1 and 3 are spaced apart by rib members 5 arranged in pairs, as shown in Fig. 1. Other ribs 6 are positioned between the pairs of ribs 5. Suitable wing covering 7 is positioned over the spars 1, 2 and 3 and the ribs therebetween.

The wing covering 7 projects past the rear edge of the rear spar 3 forming ledges 7a along the upper and lower sides of said spar member 3 adapted to receive a wing section member 8. The wing section member 8 is channel shaped with the base portion 8a positioned vertically and extending longitudinally with the wing. The lower wall 8b forms a continuation of the lower surface of the wing, while the upper wall 8c forms substantially a continuation of the upper surface of the wing; thus, the extended ends of the side walls are closer together at their extended edges than at the base portion. The base 8a telescopes slightly between the ledge members 7a and forms a loose joint therewith. The extended ends of the walls 8b and 8c receive the base portion 8a of an adjacent wing section member 8 forming a telescoping joint. As many of these wing sections 8 as desired are provided. Each one telescopes with the adjacent ones and their outer surfaces together form a continuation of the wing profile. The last and smallest wing section 8 forms a loose connection with a trailing edge member 9 which is substantially triangular in cross-section, as shown in Figs. 3 and 4.

The telescoping portions of the side walls of each wing section member are curved slightly, as shown in Fig. 2. The upper wall 8c of each wing section member 8 is provided with a plurality of holes 8d adjacent to its extended edge which are in transverse alinement with other holes 8d provided in the lower wall 8b thereof.

The telescoping portion of each wing section member 8 is provided with slots 8e in the side walls 8b and 8c which register with the holes 8d, as shown in Fig. 2.

A plurality of pin members 10 pass through alined holes 8d and through the slots 8e which register therewith. Suitable reinforcing 8f is provided around the holes 8d and other suitable reinforcing 8g is provided around the slots 8e, as shown in Fig. 2. Thus each wing section member has a limited arcuate movement relative to its adjacent member, as shown by the dotted lines in Figs. 2 and 3.

In order to hold the walls 8b and 8c in the proper relation to the base portion 8a, a plurality of webs 11 extend outwardly a short distance from the base member 8a in spaced relation to each other and join the walls 8b and 8c, as shown best in Figs. 1, 2 and 3.

Substantially centered relative to a median line drawn between the members of each pair of ribs 5 and extending in opposite directions from the upper and lower sides, respectively, of the trailing edge member 9, are anchor members 12 and 13. These anchors are connected together through the trailing edge member 9 by rivets 14 or the like. A tension cable 15 is secured to one of the rivets 14 and extends through holes provided in the several base members 8a, and in the rear spar member 3, as shown in Figs. 1 and 3, and pass into the space between the members of the corresponding pair of ribs 5. The openings provided in the bases 8a of the wing section members through which the tension cables 15 pass are reinforced by guide members 16.

The end of the cable which extends between the members of the pair of ribs 5 is secured to a spring 17, the extended end of which is in turn supported by spring supporting brackets 18, which are secured to the rear spar member 3 and extend forwardly thereon. The supporting brackets are held against side movement by a brace member 19 which extends between the pairs of ribs 5, as shown in Figs. 1 and 3.

Supported by each pair of ribs 5 adjacent to the rear spar member 3 on the outer, upper side of the wing, is an upwardly extending streamline horn 20. Another streamline horn 21 is supported by the pair of ribs 5 adjacent to the rear spar member 3 and extends downwardly therefrom. The extended ends of the horn members 20 and 21 revolubly support pulleys 22 and 23, respectively.

Supported adjacent to the rear side of the main spar member 1 by bearings 24 and extending longitudinally with the wing is a control operating shaft 25. Secured to the control operating shaft 25 between members of each pair of ribs 5 is a cable drum 26. A cable 27 is secured to the anchor 12, passes over the pulley 22 through a slit in the wing covering, and around the corresponding cable drum 26. A similar cable 28 is secured to the under side of the anchor 13, passes over the pulley 23 through a slit in the wing covering, and around the cable drum 26 in the opposite direction to the cable 27.

Rotation of the control operating shaft in one direction shortens the one cable and lengthens the other, thereby shifting the trailing edge member 9 upward or downward and causing a corresponding movement of the wing section members 8 so that the shape of the wing may be varied, as indicated by the dotted lines in Fig. 3. As the drum does not have to make a complete revolution in order to accomplish the desired movement of the wing section members and trailing edge member, the cables 27 and 28 may be rigidly secured to said drum so that no slipping will occur.

Between the pairs of ribs 5, the wing is provided with a longitudinally extending opening or slot 29 therethrough which is relatively narrow where it intersects the upper surface of the wing but is comparatively wide where it intersects the lower surface of the wing. The rear side of each opening 29 is adjacent to the forward side of the rear spar member 3. Each of these wing openings is walled on its sides and edges so as not to communicate with the interior of the wing.

Each opening 29 is adapted to be closed by a gate 30 which conforms to the shape of its opening 29, being approximately triangular in cross-section with the hypotenuse curved and constituting the forward and upper sides thereof. Each gate member is connected at its lower rear side to the spar member 3 by hinge members 31 which permit the gate to pivot downwardly out of its opening 29. Adjacent to each end of the gate member on the upper or curved side thereof there is provided a bracket 32 which extends through a slit provided in the forward wall of the corresponding opening 29.

A short link member 33 is connected to each bracket 32 which in turn is connected to the one longer arm 34a of a lever member 34 extending transversely with the wing. The lever is pivoted intermediate its ends on a pin extending from a lever support 35 which extends from an adjacent bearing member 24. Secured to the control operating shaft 25 so as to engage the other or shorter arm 34b of the lever, is a cam 36. There are preferably two cams for each gate member, one opposite each end thereof so as to ensure proper movement thereof. Each cam is preferably a disc with a channel cut therein for receiving a roller or pin extending from the shorter arm 34b of the corresponding lever 34. In this manner the cam acts positively on the lever at all times.

Each cam is so arranged that when the control shaft 25 is turned so as to depress the trailing edge of the wing by the action of the lower cable 28, the cams 36 cause the gate 30 to open creating a slot or passage S between the opening 29 and said gate, as indicated by the dotted lines in Fig. 4. Air engages the lower projecting edge of the gate 30 and is forced upwardly through the slot S so as to enter the slip stream on the upper side of the wing. As the air issuing from the slot S is directed along the upper surface of the wing it decreases the likelihood of blurbing or breaking away of the slip stream from the wing so as to cause eddies and decrease efficiency. As the slot is only needed when the curvature of the trailing edge is relatively great, the cams may be arranged so that the gate will not open until the blurbing point is almost reached. Thus under ordinary circumstances the gate offers little or no interference with the flow of air around the wing.

As each section member is narrow and constitutes only a small proportion of the wing cord, the several flat surfaces formed by the section members and trailing edge member in all their positions approximate a curved surface so closely that the eddies and whirls created by the angles between the several members are negligible. This is indicated by the dotted lines in Fig. 3.

When the structure shown is used in connection with elevators or fins, the portion forward of the movable wing section members forms the stabilizer or fin for the elevator or rudder, as shown in Fig. 6.

When an airplane is equipped with my airfoil forming its wings or sustaining means, the control shaft of each wing may be so connected together that the tail portions of the wings may move in the same or in opposite directions, thereby acting not only as variable lift wings but also as ailerons.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an airfoil, a body portion, a plurality of section members extending longitudinally therewith and joining each other and said body portion at their side margins, means for shifting said section members relative, to each other so as to vary the camber of said airfoil, and slot and gate means co-operating with said airfoil sections for bypassing air from the one side to the other side of said airfoil.

2. In an airfoil, a body portion, an airfoil section member rotatably connected thereto along its one side, other airfoil section members rotatably connected along their side margins to each other and to said first airfoil section member, the outer surfaces of said airfoil section members together with said supporting portion forming a variable cambered airfoil, control means for rotating said airfoil section members so as to vary the camber of said airfoil, and slot and gate means co-operating with said airfoil sections for bypassing air from the one side to the other side of said airfoil.

3. In an airfoil, a multi-jointed flap means comprising a plurality of airfoil sections, hinge means joining said airfoil sections for permitting limited rotational movement of each of said airfoil sections, the outer surfaces of said airfoil sections arranged to approximate a stream line surface when in any of their shifted positions, and slot and gate means positioned adjacent to said flap means for co-operating therewith by bypassing air from the one to the other side of said airfoil.

4. In an airfoil, a body portion, a plurality of airfoil sections partly telescoping with each other and with the one edge of said body portion, hinge means holding said airfoil sections in such relation and permitting limited rotational movement of each airfoil section relative to adjacent sections, said body portion constituting the forward portion of said airfoil, said airfoil sections constituting the trailing portion of said airfoil, said airfoil sections adapted by their shifting to vary the camber of said airfoil, and means connected with the outermost section only for simultaneously controlling the movement of all of said airfoil sections.

5. In an airfoil, a body portion, a plurality of airfoil sections partly telescoping with each other and with the one edge of said body portion, hinge means holding said airfoil sections in such relation and permitting limited rotational movement of each airfoil section relative to adjacent sections, said body portion constituting the forward portion of said airfoil, said airfoil sections constituting the trailing portion of said airfoil, said airfoil sections adapted by their shifting to vary the camber of said airfoil, means for controlling the movement of said airfoil sections, slot and gate means formed in the body of said airfoil arranged to co-operate with said airfoil sections by bypassing air from the one side of said airfoil to the other.

6. In an airfoil, a body portion, a plurality of airfoil sections partly telescoping with each other and with the one edge of said body portion, resilient tie means connecting the outermost section with said body portion for maintaining said airfoil sections in telescoping relation, and stop means for limiting the relative movement of said airfoil sections, said stop means arranged to permit limited angular movement of each airfoil section relative to the adjacent sections and to said body portion, and means connected with said outermost section only for shifting all of said sections into various angular positions.

7. In an airfoil, a body portion, a plurality of airfoil sections partly telescoping with each other and with the one edge of said body portion, resilient means for maintaining said airfoil sections in telescoping relation, and stop means for limiting the relative movement of said airfoil sections, said stop means arranged to permit limited rotational movement of each airfoil section relative to the adjacent sections and to said body portion, said airfoil sections together with said body portion adapted to approximate a stream line shape in any of the various positions of said airfoil sections, slot and gate means co-operating with said airfoil sections when in certain positions by bypassing air from the one side to the other of said airfoil.

8. In an airfoil, a body portion, a plurality of airfoil sections partly telescoping with each other and with the one edge of said body portion, resilient means for maintaining said airfoil sections in telescoping relation, stop means for limiting the relative movement of said airfoil sections, said stop means arranged to permit limited rotational movement of each airfoil section relative to the adjacent sections and to said body portion, said airfoil sections together with said body portion adapted to approximate a stream line shape in any of the various positions of said airfoil sections, slot and gate means co-operating with said airfoil sections when in certain positions by bypassing air from the one side to the other of said airfoil, and control means for shifting said airfoil sections and causing the co-acting of said slot and gate means when said airfoil sections are in certain positions.

9. In an airfoil, a body portion, a plurality of telescopically arranged airfoil sections of substantially channel shape, the base portions positioned vertically and the leg portions converging outwardly and forming upper and lower surfaces, the outer margins of the legs of each section overlapping the inner margins of the outwardly adjacent section, complementary transverse slots in said inner margins, vertically disposed pins extending through said slots and secured at their ends to said overlapping margins for permitting limited relative angular movement of said sections, and means connected with one of said sections for causing simultaneous angular movement of each of said sections.

In testimony whereof, I have hereunto set my hand at San Diego, California, this 11th day of July, 1929.

JOHN S. MAXWELL.